United States Patent [19]

Osawa et al.

[11] Patent Number: 5,591,266
[45] Date of Patent: Jan. 7, 1997

[54] EXTRUSION TYPE COATING HEAD

[75] Inventors: Yoshihisa Osawa, Miyota-machi; Eizo Tsunoda, Komoro; Ryuji Hosogaya, Saku; Akira Hatakeyama, Saku; Hideki Tanaka, Saku; Seiichi Tobisawa, Hino, all of Japan

[73] Assignees: TDK Corporation; Konica Corporation, both of Tokyo, Japan

[21] Appl. No.: 408,564

[22] Filed: Mar. 22, 1995

[30] Foreign Application Priority Data

Mar. 25, 1994 [JP] Japan .................................. 6-077772

[51] Int. Cl.⁶ ...................................................... B05C 3/02
[52] U.S. Cl. ............................................ 118/410; 118/419
[58] Field of Search .................................... 118/410, 419, 118/411; 425/461, 462, 113

[56] References Cited

U.S. PATENT DOCUMENTS

| | | | |
|---|---|---|---|
| 5,173,119 | 12/1992 | Watanabe et al. | 118/410 |
| 5,336,322 | 9/1994 | Tobisawa et al. | 118/410 |
| 5,397,600 | 3/1995 | Shibata et al. | 118/410 |

FOREIGN PATENT DOCUMENTS

| | | |
|---|---|---|
| 60-10785 | 3/1985 | Japan . |
| 6134380 | 5/1994 | Japan . |

OTHER PUBLICATIONS

Patent Abstracts of Japan, No. 58 (C–1028), JP–4–281876, Oct. 7, 1992.

*Primary Examiner*—Brenda A. Lamb
*Attorney, Agent, or Firm*—Oblon, Spivak, McClelland, Maier & Neustadt, P.C.

[57] ABSTRACT

In an extrusion type coating head according to the present invention, a center line average roughness (Ra) of an inner wall surface of a pocket is made in a predetermined range of 3.5 μm or less and preferably a curvature part is provided, in the part where a surface of a slit joins to a surface of the pocket, which has the radius of curvature R of within a predetermined range. By these configurations, an easiness of cleaning in the pocket of the extrusion type coating head which is difficult to be cleaned is remarkably improved in particular, the rate of operation is improved, labor is saved, and adverse effects are prevented that might be brought by insufficient cleaning on the product coating such as streak generated on the coating surface and thickness fluctuation in the coating.

7 Claims, 7 Drawing Sheets

EXTRUSION TYPE COATING HEAD

BACKGROUND OF THE INVENTION

1. Field of the Invention

The present invention relates to an extrusion type coating head that is used for applying, for example, magnetic coating onto a support.

2. Description of the Prior Art

Conventionally, when a magnetic recording medium is produced by applying a coating solution such as magnetic coating on a support, for example, various coating methods have been adopted such as gravure, reverse, extrusion, and doctor blade coating methods.

Among them, the extrusion type coating method is, in particular, characteristic in that a very uniform thin film is obtained even if the film thickness in wet condition is 10 μm or less, and suitable for a precise thin film coating. Thus, the extrusion type coating method has been noted for a very suitable coating method as a production process of a magnetic recording medium that requires a thin film coating for the purpose of high density recording. Therefore, various extrusion type coating heads used in this coating method have been proposed heretofore.

In general, basic composition of a simplest extrusion type coating head has, as shown in FIG. 11, a front edge 111 and a back edge 113 which are jointed to each other, and side plates 114, 114 which are secured at both ends of the edges 111, 113 so as to seal the both ends thereof. The back edge 113 has a concave part to form a so-called pocket 117 and a polished surface for forming a slit 118, in which the polished surface is connected to the concave part. The accuracy of opening of the tip end of the slit 118 and the accuracy of matching the slit tip end, after the assembly of the front edge 111 and the back edge 113, delicately influence the coating quality. For this reason, the coating head that has been once assembled and minutely adjusted is desired not to be separated even at the cleaning after the coating work, without removing the joint of the front edge 111 and the back edge 113.

As a method of cleaning such coating head, in the Japanese Patent Laid-open Publication No. HEI 4-281876 proposed is a cleaning method for a coating device that is to apply a coating solution to a continuously running support. The coating device has a slot from which the coating solution is extruded and has a removable spacer which is removed after the coating work for allowing cleaning means such as a brush and high pressure hose to be inserted from an end part of the coating device, and the spacer limits the width of coating.

However, it is difficult to clean the inner part of a coating head perfectly without paying attention to the inner conditions of the extrusion type coating head by a simple mechanical treatment from outside, as proposed in the Japanese Patent Laid-open Publication No. HEI 4-281876. It has become clear in particular, as a result of ardent study by the present inventor, that the adhesion of coating solution that remains in the wall surface of the pocket in an extrusion type coating head is found to be strong and difficult for being removed cleanly. It has been also found that the coating solution may sometimes remain partially in the corner of the boundary of the slit surface and the adjacent pocket surface. In this situation it has been also found that the coating solution as a stain or fouling is difficult for being removed completely.

As explained above, the coating solution that remains as a stain or fouling in the wall surface of the pocket in an extrusion type coating head is difficult for being removed completely by usual cleaning. When the coating head that remains cleaned insufficiently is mounted again in a coating device, the streak and the coating thickness fluctuation might occur in the product coating surface.

The present invention is made under such situation and aims to improve easiness of cleaning, thereby improving the rate of operation, saving labor, and preventing adverse effects such as the streak generated on the coating surface and the thickness fluctuation in the coating that might be brought by insufficient cleaning.

SUMMARY OF THE INVENTION

For attaining these objects, the present inventors have ardently studied by noting the value of center line average roughness (Ra) in the inner wall surface of the pocket, the value of radius of curvature of the joint curvature part formed by the slit surface and pocket surface. As a result, the present inventors have found that these values significantly contribute to the easiness of cleaning of the pocket of extrusion type coating head and accordingly contribute to the product quality, and have completed the present invention.

The present invention relates to an extrusion type coating head for applying a coating solution onto a support, provided with a pocket storing the coating solution fed in the coating head temporarily for extruding the solution uniformly and a slit that is connected to the pocket and serves as a delivery port for extruding the coating solution, wherein an inner wall surface of the pocket is made to have a center line average roughness (Ra) of 3.5 μm or less.

The inner wall surface of the pocket, according to a preferred embodiment of the present invention, is made to have a center line average roughness (Ra) of 3.0 μm or less.

In another preferred embodiment, at least one curvature part which has the radius of curvature R in a range of 0.1 to 5.0 mm in the part where the slit surface joins to the surface of the pocket connecting to the slit, is provided.

In still another preferred embodiment, the radius of curvature R formed in the part where the slit surface joins to the surface of the pocket is in a range of 1.0 to 3.0 mm.

In still another preferred embodiment, the curvature part mentioned above is formed by work rounding the topmost vertex of the corner that is the boundary of the slit surface mentioned above and the surface of the pocket connecting to the slit surface.

In still another preferred embodiment, the curvature part mentioned above is formed by chamfering the topmost vertex of the corner that is the boundary of the slit surface mentioned above and the surface of pocket connecting to the slit surface, thereafter applying a work rounding to both ends of the chamfered part.

According to the present invention of such composition, a coating solution fed from a supply means such as a pump for the solution reaches the extrusion type coating head and is stored in a pocket located inside the coating head, passes through the slit (gap) portion that communicates to the pocket, and is extruded to the outside the head. The extruded coating solution is coated on a support. Since the center line average roughness (Ra) of the pocket inner surface is made in a predetermined range and preferably a curvature, having a predetermined range of the radius of curvature, is provided in the part where the slit surface joins to the surface of the pocket connecting to the slit, the easiness of cleaning the pocket of an extrusion type coating head which is difficult to be cleaned is remarkably improved, the rate of operation is improved, labor is saved, and adverse effects such as the streak generated on the coating surface and the thickness fluctuation in the coating that might be brought by insufficient cleaning, are prevented.

DETAILED DESCRIPTION OF THE PREFERRED EMBODIMENTS

Now, embodiments of the present invention are explained in details referring to FIGS. 1 through 10.

At first, an embodiment of the extrusion type coating head according to the present invention is explained for the case of a so-called monolayer extrusion type coating head, a simplest shape (FIGS. 1 through 6).

Figure 1:
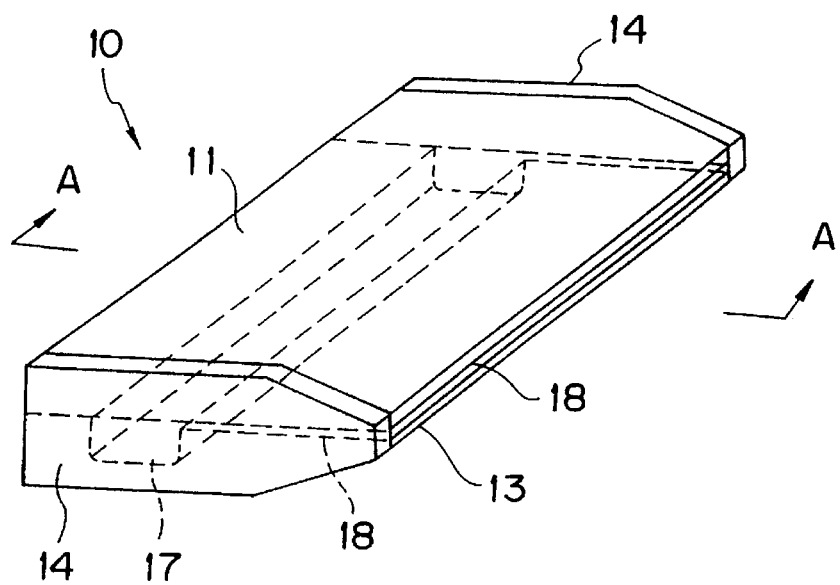
FIG. 1 is a perspective view of a coating head for monolayer extrusion according to the present invention.
Figure 2:
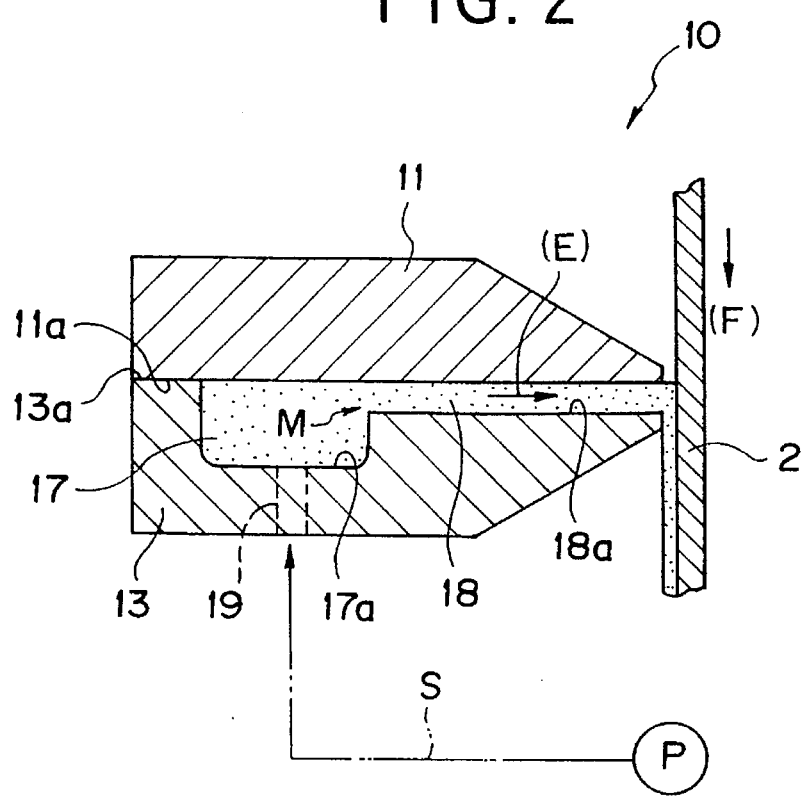
FIG. 2 is a cross section view taken along the line A—A of FIG. 1 illustrating the process of coating specifically.
Figure 3:
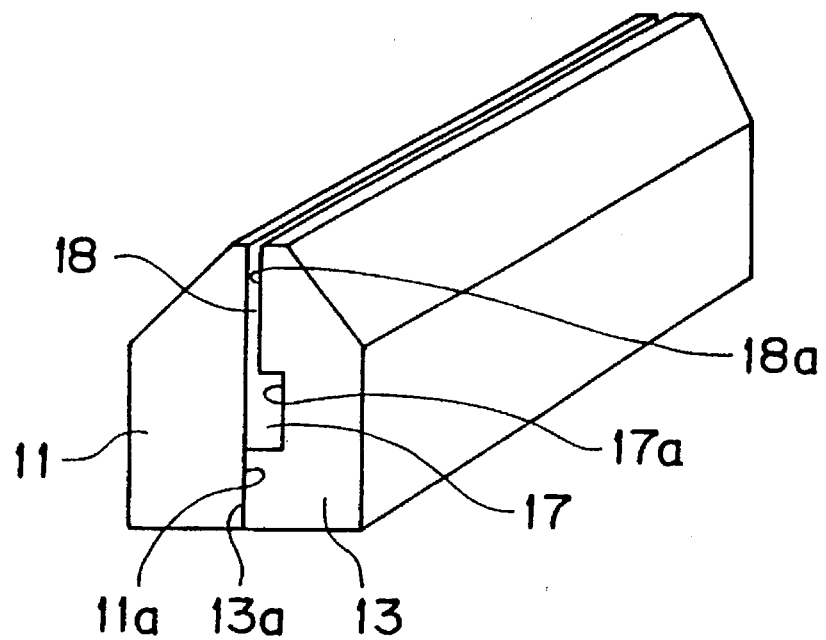
FIG. 3 is a perspective view when side plates 14, 14 are removed from FIG. 1.
Figure 4:
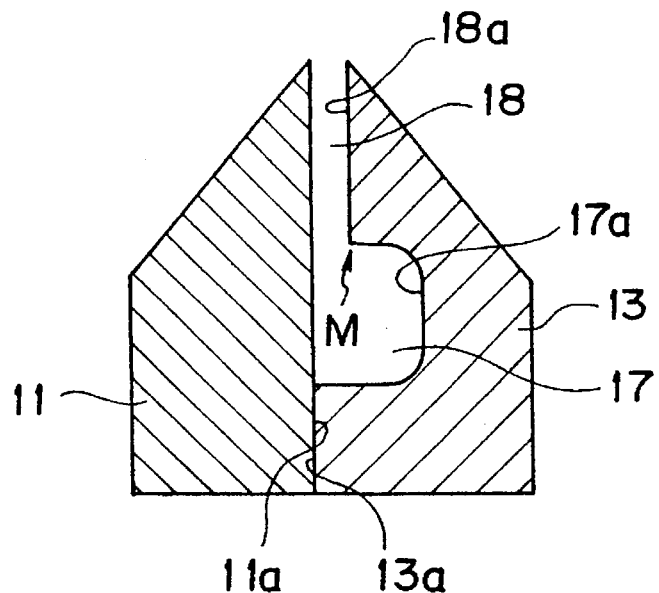
FIG. 4 is a cross section view taken along the line A—A of FIG. 1.

FIG. 1 is a perspective view of a coating head for monolayer extrusion. As shown in FIG. 1, a monolayer extrusion type coating head 10 is formed by combining a front edge 11 and a back edge 13 and thereafter sealing both sides of the front edge 11 and back edge 13 with side plates 14, 14. FIG. 2 is a cross section view taken along the line A—A of FIG. 1 illustrating the process of coating specifically. FIG. 3 is a perspective view when side plates 14, 14 are removed from FIG. 1, showing only the combination of the front edge 11 and the back edge 13.

As shown in FIGS. 2 and 3, the back edge 13 has, from one end to the other end of the coating head in the direction of width, a joint surface 13a that faces the front edge 11, a concave part 17a for forming a pocket 17 that stores solution, and a polished surface 18a (the surface is polished for forming a slit 18 on the basis of the joint surface 13a: hereinafter simply referred to as "slit surface 18a") that forms the slit 18.

On the other hand, the front edge 11 has a smooth surface 11a, which is combined with the joint surface 13a of the mentioned back edge 13 to form the pocket 17 and the slit 18.

By jointly combining the smooth surface 11a of the front edge 11 with the joint surface 13a of the back edge 13, the pocket 17 and the slit 18 are formed.

The pocket 17 is connected to an outside feed line S for a coating solution through a connection port 19 as shown in FIG. 2. The coating solution sent by a supply means such as a pump P is introduced into the pocket 17 through the feed line S. The coating solution introduced into the pocket 17 is pushed out through the slit 18 like arrow (E) (FIG. 2). The solution pushed out is coated onto one surface of a support 2 that is conveyed in the direct ion of arrow (F).

The coating head 10 for applying the coating solution onto the support 2 according to the present invention is provided with the pocket 17 that stores the coating solution temporarily for uniform extrusion of the coating solution supplied into the extrusion type coating head and provided with the slit 18 that is connected to the pocket 17 and serves as the extrusion port of the coating solution. According to the present invention, an inner surface of the pocket 17 is so set as having a center line average roughness (Ra) of 3.5 μm or less, preferably 3.0 μm or less.

When this value exceeds 3.5 μm, inconvenience of insufficient cleaning of the pocket inner wall will occur, in case of cleaning the extrusion type coating head 10 without perfect decomposition (for example, only side plates 14, 14 shown in FIG. 2 are removed). This might mean the extrusion type coating head 10 is mounted with imperfect cleaning on the coating device again, which might result in poor product (coating surface particularly). The lower limit value of the center line average roughness (Ra) is not to be specified. The value endlessly reaching zero is preferable although economic aspect should be considered. Sophisticated technology today for fabrication makes it possible to set a lower limit, for example, to Ra=0.03 μm.

The inner surface wall of the pocket 17 means herein the wall surface of the concave part 17a that is to form the pocket 17. The wall surface 11a that is faced with the concave part 17a preferably has nearly same center line average roughness as the concave part 17a. While the concave part 17a is provided in the side of the back edge 13, it may be provided in the side of the front edge 11 as well.

The center line average roughness (Ra) defined herein is the value measured in accordance with JIS B 0601 (1982). That is, a part of the unit length l is taken from a roughness curve; the center line of the part taken away is set to X-AXIS and the direction of longitudinal magnification is set to Y-AXIS; and when the roughness curve is represented by y=f (x), the value calculated by the following equation in terms of micrometer (μm) is the center line average roughness (Ra).

$$Ra = \frac{1}{l} \int_0^l |f(x)| \, dx$$

In the present invention, in addition to controlling the center line average roughness (Ra) of the inner wall surface of the pocket 17, it is preferable that at least one curvature part is provided which has a radius of curvature R is in a range of 0.1 to 5.0 ram, preferably in a range of 1.0 to 3.0 mm, in a joint part M where the slit surface 18a of the mentioned slit 18 joins to the pocket surface 17a (same surface as the above-mentioned surface 17a forming the concave part).

Figure 5:
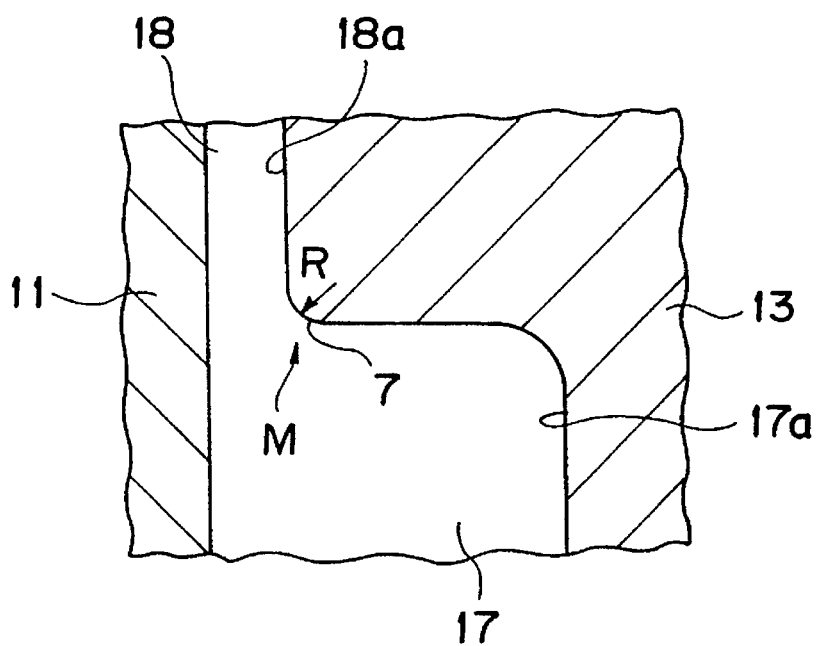
FIG. 5 is an enlarged fragmentary cross sectional view showing a part near the joining location of the slit surface and pocket surface.
Figure 6:
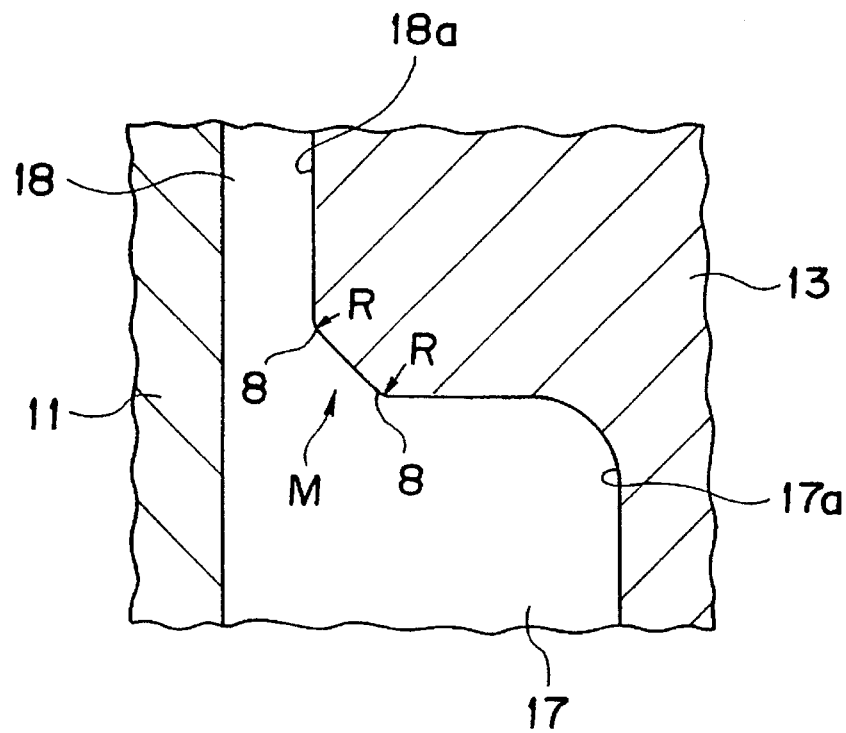
FIG. 6 is an enlarged fragmentary cross sectional view showing a part near the joining location of the slit surface and pocket surface.

The manner to provide at least one curvature part in the joint part M explained above may be any one of the following ways provided that the radius of curvature R is in the range defined above. (1) To form a curvature 7 by a work rounding a topmost vertex of a corner that is a boundary of the slit surface 18a and the pocket surface of 17a of the pocket 17 connecting to the slit surface as shown in FIG. 5. (2) To form two curvatures by chamfering the topmost vertex of the corner that is the boundary of the slit surface 18a mentioned above and the pocket surface 17a of the pocket 17 connecting to slit surface 18a once, and thereafter applying a work rounding to both ends of the chamfered part to form two curvatures as shown in FIG. 6; or to form three or more curvatures in a similar way by chamfering as many times as required. When the value of the radius of curvature R is less than 0.1 mm or more than 5.0 mm, the coating solution tends to remain in the joint part M where the slit surface 18a of the mentioned slit 18 joins to the pocket surface 17a and the remaining material is, inconveniently, very difficult for being removed by usual cleaning. Furthermore, preferably, other corners that exist inside the pocket 17 are applied by works rounding into curvatures in addition to the joint part M where the slit surface 18a meets the pocket surface 17a.

Figure 7:
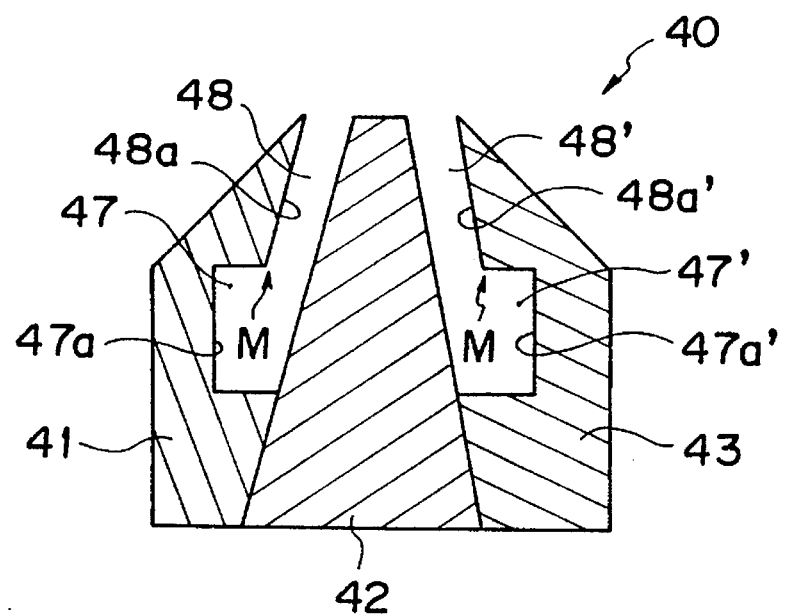
FIG. 7 is a perspective view of a two-layers extrusion type coating head.
Figure 8:
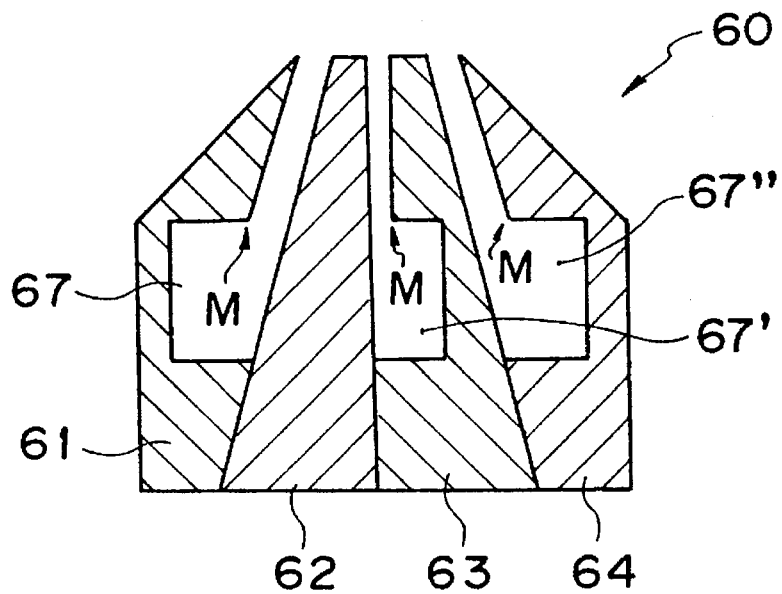
FIG. 8 is a perspective view of a three-layers extrusion type coating head.
Figure 9:
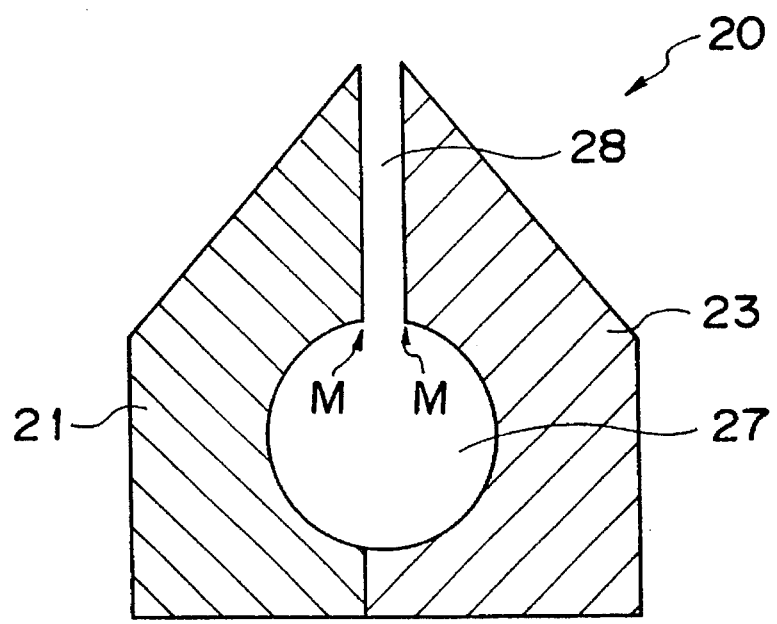
FIG. 9 is a perspective view of another monolayer extrusion type coating head.

Another embodiment of an extrusion type coating head for a monolayer, as shown in FIG. 9 by reference numeral 20, has a pocket 27 that is nearly a circle and a slit 28 connecting thereto (reference numerals 21 and 23 indicate the front and back edges respectively). Also in this embodiment, the center line average roughness (Ra) of the inner wall of the pocket 27 should be within the predetermined range according to the present invention and it is preferable to provide curvatures of the predetermined M,M. curvature radii in the two joint parts While the case of a so-called monolayer extrusion type coating head, a simplest shape, is explained above as an embodiment of the extrusion type coating head according to the present invention, the present invention is also applicable to a multilayer extrusion type coating head having a plurality of slits and pockets as shown in FIGS. 7 and 8. Now, a simple explanation follows.

A two-layers extrusion type coating head 40 shown in FIG. 7 comprises a front edge 41, a center edge 42, and a back edge 43. The front edge 41 and the back edge 43 have concave parts 47a, 47a to form pockets 47, 47' respectively and polished surfaces 48a, 48a' to form slits 48, 48' respectively. Furthermore, preferably, the values of curvature radii of the curvature parts provided in the joint parts M, M are made within the predetermined range mentioned above.

A three-layers extrusion type coating head 60 shown in FIG. 8 is composed of four blocks combined, namely a front edge 61, a center edge 62, a center edge 63, and a back edge 64. Also in this embodiment, the values of center line average roughness (Ra) of the inner walls of pockets 67, 67', 67" are made within the predetermined value according to the present invention as mentioned above. Furthermore, preferably, the values of curvature radii of the curvature parts provided in the joint parts M, M, M are made within the predetermined range mentioned above.

Examples of coating solutions that can be used for the extrusion type coating head of the present invention include a magnetic paint, which is used in the production of magnetic recording medium. The magnetic paint may contain magnetic powders, binders, and solvents. Examples of magnetic powders include fine powders of oxides such as $\gamma$—$Fe_2O_3$, Co-containing $\gamma$—$Fe_2O_3$, $Fe_3O_4$, Co-containing $Fe_3O_4$, $CrO_2$, barium ferrite, and strontium ferrite; metals such as Fe, Co, and Ni, and their alloys; and iron carbide. As for the binder, any known resin binders may be used. There is no particular limitation to the solvent, which may be suitably selected, depending on the application, from ketones such as cyclohexanone and methylethylketone; and aromatics such as toluene. The magnetic paint may also contain additives such as inorganic fine particles and lubricants as required.

A preferred magnetic recording layer formed by the magnetic paint mentioned above has a thickness in dryness of 0.1 to 6 μm and has a composition in which the magnetic powder occupies 30% to 90% by weight of the magnetic recording layer. The coating layer may be made into multilayer by coating the many coating solutions in wet condition. In this case, the coating solution is not limited to a magnetic paint or solution, any coating solution as mentioned above which is suitable for coating with a extrusion type coating head is applicable including non-magnetic solution and solution containing dissolved resin, and the layer composition of the coating solution may be selected as desired.

Examples of the support on which the coating solution is applied, include plastic films such as polyethyleneterephthalate film, long flexible supports comprising paper and metal foil, and are not limited specifically. The support may comprise layers that are subjected to pretreatment in various ways. An example of a series of coating processes of applying a coating solution on a support and winding is explained by referring to FIG. 10. The coating solution extruded from the extrusion type coating head 10 is applied at first to the support 2 that is drawn out from feed roll 30. The support applied by the coating solution is introduced into dryer 31 where the coating solution is allowed to dry, and thereafter it is wound by winding roll 32. In the case where a magnetic paint is used as the coating solution, steps for a magnetic orientation and calendering are properly installed at predetermined positions.

Now specific examples according to the present invention are given for explaining the present invention in further details.

EXAMPLE 1

At first, a magnetic paint 1 of the following composition was prepared.

|  | Parts by weight |
| --- | --- |
| Co— containing $\gamma$-$Fe_2O_3$ (Hc: 750 Oe, BET value: 43 $m^2$/g) | 100 |
| Alumina powder | 5 |
| Vinylchrolide-vinylacetate-vinylalcohol copolymer (Polymerization degree = 310, composition rate = 88:6:6) | 10 |
| Polyester polyurethane resin | 10 |
| Carbon black | 5 |
| Stearic acid | 2 |
| Butylstearate | 1 |
| Methylethylketone | 100 |
| Toluene | 100 |
| Cyclohexanone | 80 |

The materials in the above composition were mixed and kneaded, dispersed, and filtered; and 4 parts by weight of polyisocyanate was added therewith to make a coating solution.

Next, the coating head 10 for monolayer extrusion shown in FIG. 1 was prepared which comprised two blocks (the front edge 11 and the back edge 13) and two side plates 14, 14 blocking the ends of these blocks. The above-mentioned coating solution was continuously fed by use of the pump P (FIG. 2) into the coating head 10 until uniform extrusion is made in the direction of width from the tip end of the slit 11, then the feed was stopped. Thereafter, the following cleaning experiments were made.

Side plates 14, 14 of the coating head 10 for monolayer extrusion were removed, and the coating solution that remained inside was exhausted. Then, a nonwoven cloth was placed in pocket 17 and allowed to go and back three times in the direction of width while methylethylketone is dripped on to the nonwoven cloth, thereby the fouling (adhered coating solution) was cleaned. Thereafter, the stain or fouling in pocket 17 was transferred to an adhesive tape (Cellophane tape No. 29, made by Nitto Denko Corporation). The stain or fouling was evaluated visually.

Six kinds of coating heads 10 for monolayer extrusion were used in the experiments. Each of the center line average roughness (Ra) of the inner wall surface of the pocket 17 was 1.0 μm, 2.0 μm, 3.0 μm, 3.5 μm, 4.0 μm and 5.0 μm , respectively. The vertex of corner that was the boundary of the slit surface 18a and the pocket surface 17a was worked to make round into a curvature of R=3 mm without chamfering.

The results are shown in Table 1.

TABLE 1

| Extrusion type coating head No. | Center line average roughness (Ra) of inner wall surface of pocket | Cleanness of inner wall surface of pocket |
| --- | --- | --- |
| No. I-1 | 1.0 μm | ⊚ |
| No. I-2 | 2.0 μm | ⊚ |
| No. I-3 | 3.0 μm | ⊚ |
| No. I-4 | 3.5 μm | ○ |
| No. I-5 | 4.0 μm | x |
| No. I-6 | 5.0 μm | x |

Judgement criterion
⊚: Excellent
○: A little fouling
x: Substantial fouling

EXAMPLE 2

Experiments were made to invest igate, for the coating head 10 for monolayer extrusion, the influence of shape of the curvature at joint part M where the slit surface 18a joins to the pocket surface 17a. How the length of curvature radius and chamfering (with and without) influence was studied in the condition of Ra=1 μm for the pocket inner surface wall. Various extrusion type coating heads were prepared as shown in Table 2 including the cases with and without chamfering and varied curvature radii. The same coating solution and procedure as Example 1 were applied except that the location to be examined was the joint (boundary) part of the slit surface 18a and the pocket surface 17a.

The results are shown in Table 2.

TABLE 2

| Extrusion type coating head No. | Curvature radius R | with or without chamfering | Cleanness of pocket-slit joint |
| --- | --- | --- | --- |
| No. II-1 | 0.1 mm | without | ○ |
| No. II-2 | 1.0 mm | without | ⊚ |
| No. II-3 | 3.0 mm | without | ⊚ |
| No. II-4 | 5.0 mm | without | ○ |
| No. II-5 | 0.1 mm | with | ○ |
| No. II-6 | 2.0 mm | with | ⊚ |
| No. II-7 | 5.0 mm | with | ○ |

Judgement criterion
⊚: Excellent
○: A little fouling
x: Substantial fouling

EXAMPLES 3 and 4

Cleaning experiments 3 (Example 3) and 4 (Example 4) were made according to Example 1 and 2, respectively except the magnetic paint 1 was replaced by the following magnetic paint 2.

Magnetic Paint 2

| | Parts by weight |
| --- | --- |
| Metallic powder (Hc: 1650 Oe, BET value: 60 m$^2$/g) | 100 |
| Polyvinylchloride based copolymer | 12 |
| Polyester polyurethane resin | 8 |
| Alumina powder | 10 |
| Carbon black | 1 |
| Stearic acid | 1.2 |
| Butylstearate | 0.4 |
| Methylethylketone | 95 |
| Toluene | 95 |
| Cyclohexanone | 95 |

The materials in the above composition were mixed and kneaded, dispersed, and filtered; and 4 parts by weight of polyisocyanate was added therewith to make a coating solution.

Results of cleaning experiment 3 and 4 have proved to be nearly same as the results reported by Tables 1 and 2 above.

EXAMPLE 5

Figure 10:
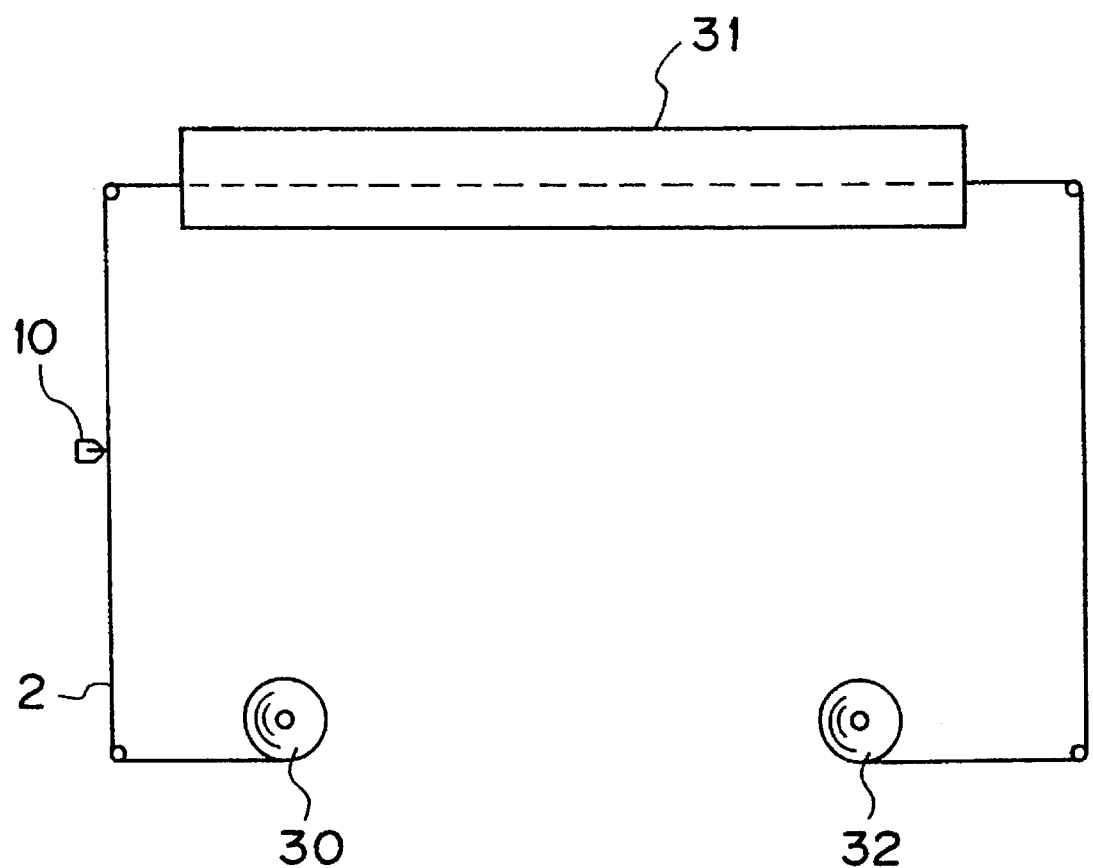
FIG. 10 is a schematic drawing showing an example of a series of coating processes of applying a coating solution on a non-magnetic support and winding.
Figure 11:
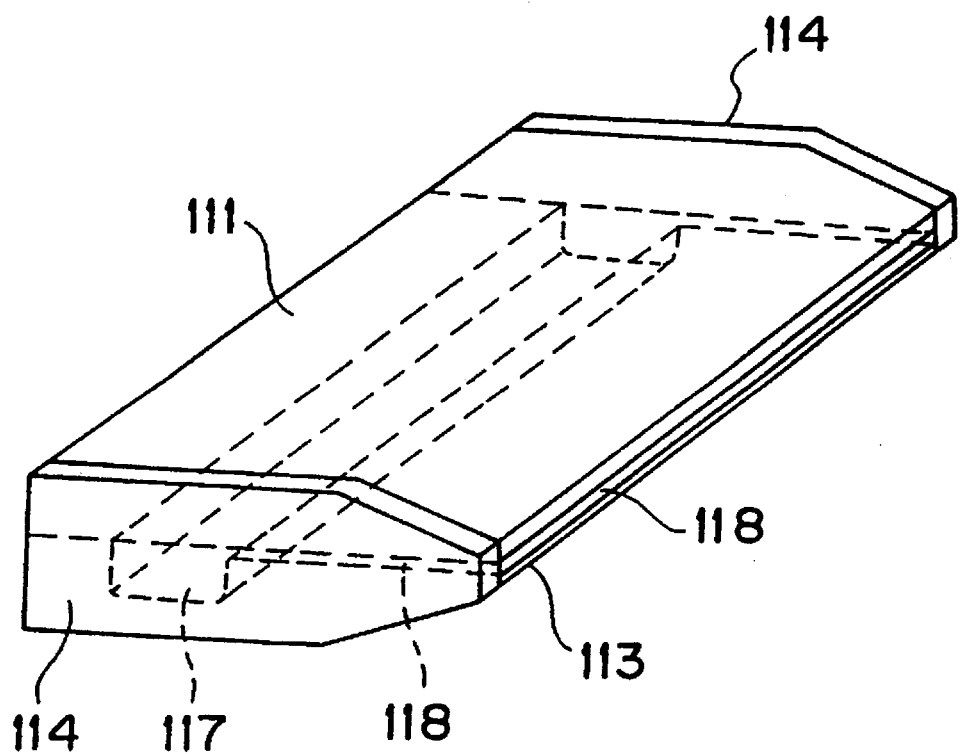
FIG. 11 is a perspective view of a conventional coating head for monolayer extrusion.

The extrusion type coating heads that were cleaned in Examples 1 and 2 respectively were prepared. The above-mentioned magnetic paint 1 was fed by use of pump P (FIG. 2) into the coating head 10 and allowed to coat continuously onto a support film that is continuously drawn off as shown in FIG. 10. The support being used was a polyethyleneterephthalate film of 1,000 mm width and 15 μm thickness. The coating thickness fluctuation and poorness caused by a coating streak, were evaluated for each first roll produced by the following procedure and criterion.

Coating thickness fluctuation

The fluctuation of coating thickness in the direction of width for 1,000 mm was measured by an X-ray coating thickness tester 3710A manufactured by Rigaku Corporation, and the maximum value of the coating thickness fluctuation was adopted as the value of coating thickness fluctuation. The judgment criterion was as follows.

⊚: Less than 0.2 μm of coating thickness fluctuation in the direction of width

○: 0.2 μm or more and less than 0.4 μm of coating thickness fluctuation in the direction of width x: 0.4 μm or more of coating thickness fluctuation in the direction of width Poorness caused by coating streak The number of streaks generated in the coating of 1,000 mm width and 1000 m length was determined. The judgment criterion was as follows.

⊚: No coating streak
○: One or two coating streaks
X: Three or more coating streaks
The resuruts are shown in Tables 3 and 4.

TABLE 3

| Extrusion type coating head No. | Center line average roughness (Ra) of inner wall surface of pocket | Coating streaks | Coating thickness fluctuation |
| --- | --- | --- | --- |
| No. I-1 | 1.0 μm | ⊚ | ⊚ |
| No. I-2 | 2.0 μm | ⊚ | ⊚ |
| No. I-3 | 3.0 μm | ⊚ | ⊚ |
| No. I-4 | 3.5 μm | ○ | ⊚ |
| No. I-5 | 4.0 μm | x | ○ |
| No. I-6 | 5.0 μm | x | x |

TABLE 4

| Extrusion type coating head No. | Curvature radius R | with or without chamfering | Coating streaks | Coating thickness fluctuation |
| --- | --- | --- | --- | --- |
| No. II-1 | 0.1 mm | without | ○ | ○ |
| No. II-2 | 1.0 mm | without | ⊚ | ⊚ |
| No. II-3 | 3.0 mm | without | ⊚ | ⊚ |
| No. II-4 | 5.0 mm | without | ⊚ | ⊚ |
| No. II-5 | 0.1 mm | with | ⊚ | ○ |
| No. II-6 | 2.0 mm | with | ⊚ | ⊚ |
| No. II-7 | 5.0 mm | with | ⊚ | ○ |

Experimental results shown above, clearly demonstrate the effects of the present invention.

In the extrusion type coating head according to the present invention, the center line average roughness (Ra) of the inner wall surface of the pocket is made in a predetermined range and preferably a curvature part is provided, in the part where the slit surface joins to the surface of pocket, which has the radius of curvature R of within a predetermined range. By these configurations, the easiness of cleaning in the pocket of the extrusion type coating head which is difficult to be cleaned is remarkably improved in particular, the rate of operation is improved, labor is saved, and adverse effects are prevented that might be brought by insufficient cleaning on the product coating such as streak generated on the coating surface and thickness fluctuation in the coating.

What is claimed is:

1. An extrusion coating head for applying a coating solution onto a support comprising, a pocket storing the coating solution fed in the coating head temporarily for extruding the coating solution uniformly, and a slit being connected to the pocket and serving as a delivery port for extruding the coating solution from the coating head and onto the support, said pocket comprising an inner wall surface having a center line average roughness (Ra) of 3.5 μm or less.

2. An extrusion coating head according to claim 1, wherein said center line average roughness (Ra) of the inner wall surface of said pocket is 3.0 μm or less.

3. An extrusion coating head according to claim 1, wherein said slit and said pocket are joined by a surface which defines a corner, said corner comprising at least one curvature part which has a radius of curvature R in a range of 0.1 through 5.0 mm.

4. An extrusion coating head according to claim 3, wherein said radius of curvature R is in a range of 1.0 through 3.0 mm.

5. An extrusion coating head according to claim 3, wherein said curvature part is formed by work rounding a topmost vertex of said corner.

6. An extrusion coating head according to claim 3, wherein said surface includes a chamfered part at said corner, said chamfered part having opposite ends, said corner comprising one of said curvature parts at each end of said chamfered part formed by work rounding said surface at each end of said chamfered part into a curvature of radius R.

7. An extrusion coating head according to claim 1, wherein said coating solution is a magnetic paint containing a magnetic powder and a binder.

* * * * *